United States Patent [19]

Russo

[11] 4,262,040

[45] Apr. 14, 1981

[54] DECORATION FOR CERAMICS HAVING THE APPEARANCE OF GOLD

[75] Inventor: Frank R. Russo, North Brunswick, N.J.

[73] Assignee: Engelhard Minerals & Chemicals Corporation, Iselin, N.J.

[21] Appl. No.: 938,186

[22] Filed: Aug. 30, 1978

Related U.S. Application Data

[63] Continuation-in-part of Ser. No. 782,196, Mar. 28, 1977, abandoned, which is a continuation of Ser. No. 613,495, Sep. 15, 1975, abandoned.

[51] Int. Cl.$^3$ .............................................. B05D 3/02
[52] U.S. Cl. ................................... 427/229; 106/1.14; 106/1.15; 106/1.28
[58] Field of Search ................ 106/1, 1.15, 1.28, 1.18, 106/1.21, 1.24, 1.14; 252/514; 427/229; 260/429 R

[56] References Cited

U.S. PATENT DOCUMENTS

| | | | |
|---|---|---|---|
| 3,216,834 | 11/1965 | Fitch | 106/1.24 |
| 3,271,193 | 9/1966 | Boykin | 106/1.24 |
| 3,345,199 | 10/1967 | Fitch | 106/1.24 |

FOREIGN PATENT DOCUMENTS

| | | | |
|---|---|---|---|
| 731506 | 4/1966 | Canada | 106/1.124 |
| 998830 | 7/1965 | United Kingdom | 106/1.24 |

*Primary Examiner*—Ronald H. Smith
*Assistant Examiner*—Janyce A. Bell

[57] ABSTRACT

A decorative coating for application to ceramics contains no metallic gold but has the appearance of gold after firing. The coating is formed by dissolving solvent-soluble metallo-organic compounds of palladium, silver, and a fluxing agent in a vehicle. A weight ratio of palladium to silver of between 1:1 and 12:1 is used and the total content of palladium and silver in the coating as applied will range between 1 and 12 weight percent, the balance being fluxing agents and vehicle. When applied to opaque or translucent ceramic bodies and fired in the usual manner for such decorations, the appearance obtained previously only with decorations containing substantial amounts of metallic gold is simulated.

17 Claims, No Drawings

DECORATION FOR CERAMICS HAVING THE APPEARANCE OF GOLD

CROSS REFERENCES TO RELATED APPLICATIONS

This is a continuation-in-part of copending application Ser. No. 782,196 filed Mar. 28, 1977, now abandoned, which is a continuation of application Ser. No. 613,495, filed Sept. 15, 1975, now abandoned.

BACKGROUND OF THE INVENTION

The invention relates generally to the field of precious metal decorations for ceramics and in particular to a decorative composition producing the appearance of gold after firing, but which actually contains no metallic gold.

Decorative compositions for ceramics to achieve a gold appearance have heretofore contained substantial quantities of metallic gold, often of the order of 10–15 weight percent with the balance being fluxing agents and vehicle. Such prior art decorations are disclosed in such patents as U.S. Pat. Nos. 2,994,614 and 3,092,504 which disclose and claim specific gold compounds and compositions which were found useful for decorations having a gold appearance. The maximum gold content is determined primarily by the cost of the gold and the fact that increasing the gold content beyond certain levels does not further improve the appearance. The minimum gold content of such decorations is determined primarily by the poorer adherence and durability of low gold content films and the deterioration in their appearance. It will be appreciated that until recent years gold, although a precious metal, was less expensive than some of the other precious metals. As the price of gold has risen, it has become of interest to reduce the quantity of gold used in decorations since at 4 to 5 times the previous cost the use of gold in decorating compositions becomes prohibitive, except for the most expensive articles.

Palladium has also been used in decorative compositions. In some compositions, it produced a white metal appearance when used in combination with gold, and simulates the heretofore more expensive platinum compositions. In other applications, it has been used to produce a brown color. Thus, in the prior art, palladium has been used both to produce a white color in combination with large amounts of gold, and to produce a brown color when no gold is present. Examples may be found in U.S. Pat. No. 3,216,834, the disclosure of which is incorporated by reference herein, which is principally directed to a new compound of palladium for use in decorative applications. In one example of the patent, a composition containing 1.5 percent palladium, 3 percent silver, and much smaller amounts of rhodium and chromium is shown to produce a chocolate brown color useful for decoration. In other examples, bright palladium decorating compositions are shown to contain large quantities of gold and smaller amounts of palladium. Other patents disclosing palladium compounds useful for decorative applications include U.S. Pat. Nos. 3,718,488 and 3,770,785. The disclosure of U.S. Pat. No. 3,216,834, which is assigned to the assignee of this application, also sets forth a number of the essential oils and hydrocarbon solvents conventionally used in the art.

Palladium has also been used with silver in a film which has the ability to separate gaseous mixtures by hydrogen diffusion through the film. U.S. Pat. No. 3,413,777 discloses such a film which contains an alloy of 5–40 weight percent silver and the remainder palladium, the alloy being mixed with a glaze in the method of forming the desired film.

Silver, when used alone, produces a film having an amber appearance. What has been desired since the cost of gold has increased many-fold is a decoration for ceramics which, while giving the appearance of gold after firing, does not contain substantial quantities of that metal, in order that the cost may be kept at reasonable levels. This objective has been accomplished by the composition and the method of the present invention, in which no metallic gold is used.

SUMMARY OF THE INVENTION

In accordance with the present invention there is provided a decorating composition for producing a gold appearance after being fired on ceramics which comprises a vehicle containing an organic solvent in which metallo-organic compounds are dissolved. The composition is characterized in that its metal content, in addition to any trace impurities present, consists essentially of a palladium metallo-organic compound soluble in the solvent;

a silver metallo-organic compound soluble in the solvent; and a base metal metallo-organic flux compound soluble in the solvent.

The weight ratio, as metal, of the palladium to the silver is in the range of 1:1 to 12:1, the palladium and silver together comprise at least about one percent by weight of the composition, and the base metal flux is present in an amount sufficient to flux the silver and palladium.

In one aspect, the invention provides that the palladium and silver together comprise from about 1 to 12 weight percent of the composition. The weight ratio of palladium to silver may advantageously be in the range of 2.3:1 to 9:1 and the weight ratio of the base metal portion of the flux compound to the combined palladium and silver may advantageously be in the range of about 0.02:1 to 0.2:1.

Another aspect of the present invention provides that the base metal is selected from the class consisting of bismuth, chromium, lead, uranium, tin, iron, titanium, tantalum, zirconium and mixtures thereof. Advantageously, the palladium metallo-organic compound is a palladium salt of carboxylic acid, the silver metallo-organic compound is a silver salt of carboxylic acid and the metal flux metallo-organic compound is a metal salt of carboxylic acid. Most advantageously, the metal compounds are metal neodecanoates.

In another aspect, the invention provides that the palladium metallo-organic compound, the silver metallo-organic compound and the base metal metallo-organic flux compound are selected from the class consisting of metal sulfonates, metal sulfurized resinates, metal mercaptides, metal thioethers, and metal carboxylates.

Another aspect of the present invention provides a method of producing a decoration having a gold appearance on ceramics after firing, the method comprising the steps of preparing a decorating composition comprising a vehicle containing an organic solvent in which metallo-organic compounds are dissolved, and characterized in that the metal content of the composition, in addition to any trace impurities present, consists essentially of:
(1) a palladium metallo-organic compound soluble in the solvent;
(2) a silver metallo-organic compound soluble in the solvent, the weight ratio as metal of the palladium to the silver being in the range of 1:1 to 12:1, the palladium and silver together comprising at least about one percent by weight of the composition; and
(3) a base metal metallo-organic flux compound soluble in the solvent and present in an amount sufficient to flux the silver and the palladium.

The composition of (a) is then applied to the surface of a ceramic material to be decorated and the ceramic material to be decorated is then fired, to produce a film having the appearance of gold on the ceramic surface.

Advantageously, depending on the ceramic material, the firing is carried out at a temperature of between about 500° C. and 800° C.

Generally, in one aspect of the present invention, a gold-free composition is provided which, when applied to ceramics and fired, produces a decoration having a gold appearance. That is, the fired decoration reflects light of such wave lengths that to the human eye it has the yellow metallic appearance characteristic of gold and gold alloys. This composition contains as its principal metallic constituents, minor amounts of palladium and silver in a specific range of weight ratios to produce a gold appearance when the composition is fired on a ceramic. The palladium and silver in the form of solvent-soluble metallo-organic compounds and within the described composition ranges are combined with a suitable flux and vehicles to produce a composition having an appropriate viscosity. Outside these ranges, the color no longer satisfactorily simulates gold-containing decorations and in addition, the film has reduced reflectance or adherence. The gold appearance of the fired decoration of the present invention is particularly enhanced when applied as relatively narrow lines. It is also particularly enhanced when applied to an opaque or translucent ceramic as opposed to a clear transparent ceramic. On clear transparent ceramics some of the gold-like color and luster is lost.

Generally, in another aspect of the present invention, a method for decorating ceramics to produce a gold appearance using the above-described composition is provided. The usual techniques for applying decorative compositions, such as screen printing, rolling, dipping, stamping, spraying, or brushing may be used. Conditions under which the applied coating is fired for removing the vehicles and fusing the remaining residue are determined by the temperature which the substrate will accept, generally between 500° and 650° C. for glass and 650° to 800° C. for other ceramic materials, such as china. As used herein and in the claims, "ceramics" and "ceramic materials" and the like terms include china, dishware, glass and the like.

DESCRIPTION OF THE PREFERRED EMBODIMENTS

As indicated above, it has now been found that a combination of palladium and silver within certain narrow ranges of composition produces a decorative composition having the appearance of metallic gold after firing. Outside those ranges, the simulation of gold is unsatisfactory, and the decorative film has reduced reflectance or poorer adherence.

As is known in the art, the composition of the vehicle carring the metallo-organic compounds may be selected from a wide variety of suitable organic solvents in which essential oils may optionally be included. The ingredients and their proportions used in the vehicle are selected, as is known in the art, to adjust the characteristics of the decorating compound before firing. For example, the vehicle may comprise any suitable simple organic solvent, or mixtures of two or more thereof, such as chloroform, carbon tetrachloride, petroleum ether, heptane, kerosene, benzene, toluene, nitrobenzene, methanol, butanol, benzyl alcohol, Cellosolve, butyl Cellosolve, acetone, methyl ethyl ketone, cyclohexanone, ethyl acetate, butyl acetate, ethyl ether, turpentine, terpineol, eugenol, cedrol, amyl acetate, xylene, various terpenes such as pinene, dipentene, and the like. Among the essential oils which may be included are oils of lavender, amyris, rosemary, aniseed, sassafras, wintergreen, fennel, spike, clove and/or camphor.

The vehicle may also include as a tackifier balsams such as Oregon or Canada balsam, i.e., generally, naturally occurring fir tree exudations. Thickened gum turpentine such as obtained by evaporating spirits of gum turpentine may be employed, as well as rosins, gilsonite and any number of synthetic resins.

Plasticizers such as rosin esters may be employed, for example, methyl or glycerol esters of rosin. Suitable rosin esters which have been employed are those sold under the trademarks HERCOLYN and STAYBE-LITE by Hercules, Incorporated. Phthalates such as dioctyl phthalate and butyl phthalate may also be employed.

Generally, the metallic constituents (palladium, silver and base metal) in compositions of the present invention are present as soluble metallo-organic compounds. The neodecanoates, as shown in the examples, are preferred for ease of availability and low cost. However, other soluble organo-metallic compounds may also be used. For example, any of metal-sulfonates, -sulfurized resinates, -mercaptides, -thio-ethers, and metal carboxylates other than neodecanoates can be substituted for metal neodecanoates.

The palladium component of the composition of the invention, as is true of the silver component and the base metal used as a flux component, must be introduced in a form in which the metal (palladium, silver or flux base metal) is part of a chemical entity which is soluble in the composition. Thus, the palladium compound is introduced in the form of a palladium metallo-organic compound in solution in a solvent. As indicated above, while any suitable palladium metallo-organic compound which is soluble in a suitable solvent may be employed, generally palladium salts of carboxylic acids are preferred, and palladium neodecanoate is most preferred. The silver compound is introduced in a similar form, i.e., as a metallic-organic compound, preferably the silver salt of a carboxylic acid, most preferably silver neodecanoate.

The base metal flux agent, discussed in more detail below, is similarly introduced in the form of a soluble metallo-organic compound of the flux metal, most preferably as the salt of a carboxylic acid. Bismuth neodecanoate is preferred.

In general, branched carboxylic acids are preferred over straight chain carboxylic acids because their reaction products with the metal components of the invention are more soluble in the hydrocarbon solvents than are those of straight chain carboxylic acids.

Characteristics of ceramic decorations of the type provided by the present invention, after firing onto the ceramic surface, are not typically measured by a test method standardized within the industry, but are judged by experience with those color, reflectance, and adherence characteristics are acceptable to purchasers of such decorative compositions. It should be understood, however, that evaluation of color and reflectance, although somewhat subjective, can readily be made when comparing side-by-side samples of various decorations and that those experienced in the art would be expected to concur in such evaluations. Adherence is a more objective quality and is usually judged by rubbing the decoration with a rubber eraser containing abrasive since it is known from experience that such a test correlates well with actual service life.

The following table illustrates the sensitivity of the decorative fired film color, reflectance and adherence to the relative proportions of palladium and silver. All of the compositions shown are identical (and similar to some of the examples given hereinbelow) except for the adjustment of the ratio of palladium to silver. Each composition contained a total of 5 weight percent palladium and silver, since this amount gives particularly good results with a minimum use of these expensive metals. Each was applied by roller topping to the rim of a translucent opal glass saucer and fired at 600° C. before comparison of the film properties was made. It can be seen from the table that palladium alone, without silver, produces a brown colored film with poor adherence. The addition of small quantities of silver are insufficient to change the brown color to gold, but at the composition of 4.5 weight percent palladium and 0.5 weight percent silver, a strong gold color film is produced with good reflectance and adherence. This effect also occurs with a composition containing 4 weight percent palladium and 1 weight percent silver.

TABLE

Comparison of Palladium - Silver Compositions

| Wgt. % Pd | Wgt. % Ag | Pd: Ag Ratio | Color | Reflectance | Adherence |
|---|---|---|---|---|---|
| 5 | 0 | — | brown | good | poor |
| 4.8 | 0.2 | 24:1 | lt. brown | good | poor |
| 4.7 | 0.3 | 15.67:1 | lt. brown | good | fair |
| 4.6 | 0.4 | 11.5:1 | dk. golden | good | good |
| 4.5 | 0.5 | 9:1 | golden | good | good |
| 4.0 | 1.0 | 4:1 | golden | good | good |
| 3.5 | 1.5 | 2.33:1 | gold-amber | good | good |
| 3 | 2 | 1.5:1 | gold-amber | good | good |
| 2.5 | 2.5 | 1:1 | pale amber | fair | good |
| 2 | 3 | 0.67:1 | lt. gray | poor | good |
| 1.5 | 3.5 | 0.43:1 | lt. gray | poor | good |
| 1 | 4 | 0.25:1 | lt. gray-green | dull | good |
| 0 | 5 | — | amber | dull | good |

The color is weakened toward amber when the ratio of palladim to silver is reduced to about 1.5:1, although the reflectance and adherence are still good. At a 1:1 ratio of palladium to silver, the gold appearance has been weakened and the reflectance has been significantly reduced. A ratio of 1 weight percent palladium to 4 weight percent silver produces a green-gray color which is dull and no longer reflective. Also, tarnishing of the film may limit the amount of silver which can be used. Thus, it can be seen that only over a narrow range of compositions can the desired gold appearance be obtained. For a total palladium and silver content of 5 weight percent this range may be more broadly expressed as including compositions between 2.5 and 4.6 weight percent palladium and 0.5 to 2 weight percent silver. The preferred ranges are 3.5 to 4.5 weight percent palladium and 0.5 to 1.5 weight percent silver. Expressed as weight ratios of palladium to silver the broad range is about 1:1 to about 12:1 and the preferred range about 2.3:1 to about 9:1.

Although a total of 5 weight percent palladium plus silver is preferred for rolling application, it has been found that a satisfactory golden appearance can be achieved using both higher and lower total metal contents. Although compositions containing larger metal contents would be more expensive to produce, if such are desired, a golden appearance can be obtained by using palladium/silver weight ratios between 1:1 and 12:1. Metal contents below five percent total of palladium and silver can also be used for roller applications, although a metal content of 4 weight percent is a practical minimum, for machine banding and stamping as limited by reduced abrasion resistance and weakening of the reflective gold appearance.

The foregoing data and discussion is based on compositions suitable for such applications as machine banding and stamping which require a high viscosity mixture, which typically will contain a total of between 4 and 12 weight percent palladium and silver. For other applications which require lower viscosity mixtures, as are typically used for silk screening and brushing, the total content of palladium and silver would be about 2-4 weight percent, and for spraying about 1-2 weight percent. The ratios of palladium to silver would be maintained between 1:1 and 12:1 in such other applications as in the principal exmples.

If corresponding compositions were to be prepared from the prior art using metallic gold, the gold content of such compositions would be about 4-5 weight percent for spraying use, about 8-10 weight percent for brushing and silk screening, 12-15 weight percent for machine banding, and 15-20 weight percent for stamping. Thus, it is clear that in the present invention the total valuable metal content is distinctly lower and the cost of the metals used is less than metallic gold in the present market.

Another important component of the composition of the invention is the flux material, which is typically a soluble metallo-organic compound of a base metal as typically used in the prior art to flux palladium and silver. The fluxes have the property of softening or melting at the firing temperature which, in general, the metallic components do not. They react with the substrate and create an adhesive vitreous layer for the metallic film and at the same time bind the metallic particles in the decorative film thus improving the adherence and abrasion resistance of the fired metal film. Specifically, base metals such as bismuth, chromium, lead, cadmium, uranium, tin, copper, cobalt, antimony, manganese and rhenium are well known in the prior art. Reference may be made to U.S. Pat. No. 3,216,834 previously mentioned. However, not all of the known base metal fluxes are equally useful in the gold appearing decoration of the present invention. In general, those base metal fluxes such as cobalt and copper which form dark metal oxides unduly darken the metal film and/or adversely affect its gold-like luster. Suitable base metals for use as fluxes in the present invention include bismuth (which is most preferred) chromium, lead, uranium, tin, iron, titanium, tantalum and zirconium.

In a preferred embodiment, a metallo-organic bismuth compound, for example, bismuth neodecanoate is used. In the typical decorative compositions for roller topping, the bismuth content is preferably about 0.5 weight percent. Expressed more generally, the weight ratio of bismuth to the combined palladium and silver would typically be in the range of about 0.02:1 to 0.2:1, with a preferred weight ratio of bismuth to the sum of palladium and silver, i.e., Bi:(Pd+Ag), of about 0.1:1 (based on metal content).

Some typical decorative compositions which provide efficacious embodiments of the invention are given in the following examples.

EXAMPLE 1

|  | Weight Percent |
|---|---|
| Resin in essential oil | 47.17 |
| Palladium neodecanoate in solution in (15% Pd) | 26.42 |
| Resin ester (plasticizer) | 7.55 |
| Balsam (tackifier) | 5.66 |
| Silver neodecanoate in solution (25% Ag) | 3.77 |
| Organic hydrocarbon solvent (diluent for viscosity adjustment) | 7.55 |
| Bismuth neodecanoate in solution (26% Bi) | 1.89 |
|  | ~100.00 |

The proportions given in EXAMPLE 1 provide a rather viscous composition, well suited for machine roller application to a ceramic material. For spray or brush application, further dilution of the composition of EXAMPLE 1 half and half by weight with toluene, xylene or some other suitable solvent would produce a composition of suitably lower viscosity.

EXAMPLE 2

The composition of Example 1 in which the ingredients are as follows:
The "Resin in essential oil", is gum rosin in dipentene.
Each of palladium-, silver-, and bismuth neodecanoate is in solution in toluene.
The "Resin ester" is rosin methyl ester.
The "Organic hydrocarbon solvent" is toluene.

EXAMPLE 3

The composition of EXAMPLE 1 in which the ingredients are as follows:
The "Resin in essential oil" is gilsonite in oil of spike.
Each of palladium-, silver-, and bismuth neodecanoate is in solution in xylene.
Dioctyl phthalate is substituted for the "Resin ester".
The "Organic hydrocarbon solvent" is xylene.

EXAMPLE 4

In any one of EXAMPLES 1-3, the silver and/or palladium and/or bismuth neodecanoate may be substituted for by any of the following, in which "Met." is silver or palladium (II) or one of the base metal fluxes.

| In General | Specific Example |
|---|---|
| Met. mercaptide | Met. tertiary nonyl mercaptide |
| " | Met. tertiary dodecyl mercaptide |
| Met. sulfurized balsams generally, e.g., Met. terpene hydrocarbons | Met. sulfurized pinene |
| Met. sulfonates | Met. toluene sulfonate |
| " | Met. xylene sulfonate |
| Met. carboxylates | Met. 2-ethylhexoate |
| Met. thioethers | Met. bis-di-n-butyl sulfide |

Different types of silver or palladous (or base metal) compounds may be employed in the same composition so long as they are compatible with each other, i.e., will not react to form a precipitate or have other undesirable effects. Some suitable specific compounds useable in accordance with the present invention are:

Silver tertiary nonyl mercaptide
Silver tertiary dodecyl mercaptide
Silver naphthenate
Palladium sulfurized abalyn
Palladium sulfurized turpentine
Palladium 2-Ethylhexanoate
Bismuth rosinate
Bismuth naphthenate
Bismuth 2-Ethylhexanoate Each of these may be employed in any of EXAMPLES 1-3. Generally, toluene is preferred as a solvent, and tackifiers and plasticizers are selected to suit specific jobs and conditions.

The solvent and resins serve to form a paste or inklike material and they are added as required to adjust the viscosity needed for particular applications. Generally, it is known in the art that compositions in the range of 50–100 poise are suitable for screen printing, machine lining, rolling, and stamping applications. On the other hand, for spraying or brushing more dilute solutions are applied. Typically, these may have a viscosity of the order of 1 centi-poise. The relative proportion of the metallic constituents remain the same but they are diluted in the formulation in order to adjust the handling qualities of the resulting solution.

After being applied to a ceramic article, the composition of the present invention may be fired at temperatures typical of those of the prior art, glass being fired typically at between about 500° C. and 650° C. and china, between about 650° C. and 800° C. During firing, the organic materials are substantially decomposed and removed, leaving behind a composition which consists essentially of finely divided particles of palladium and silver in a base metal oxide binder.

The resulting fired film gives a gold appearance when the proportions of palladium and silver are properly selected in accordance with the teaching of the invention. Owing to its relatively low cost, the decorative composition of the invention can be applied to many inexpensive applications where gold decorations using the traditional high gold content compositions would be too costly.

The gold appearance of films formed according to the invention is particularly pronounced with narrower lines and an opaque or translucent material. However, the decoration always gives a golden color. The high reflectance property of such films appears to enhance the appearance of bright metallic gold when applied in narrower widths.

The foregoing description of the preferred embodiments is for illustration of the invention only and not to limit the scope of the invention which is defined by the claims which follow.

What is claimed is:

1. A decorating composition for producing a gold appearance after being fired on ceramics comprises a vehicle containing an organic solvent in which metallo-organic compounds are dissolved, and is characterized in that the metal content of said composition, in addition to any trace impurities present, consists essentially of
   (a) a palladium metallo-organic compound soluble in said solvent;
   (b) a silver metallo-organic compound soluble in said solvent; and
   (c) a base metal metallo-organic flux compound soluble in said solvent,
the weight ratio as metal of said palladium to said silver being in the range of 1:1 to 12:1, said palladium and silver together comprising at least about one percent by weight of said composition and said base metal flux being present in an amount sufficient to flux said silver and palladium.

2. The decorating composition of claim 1 wherein said palladium and silver together comprise from about 1 to 12 weight percent of said composition.

3. The decorating composition of claim 1 wherein the weight ratio of palladium to silver is in the range of 2.3:1 to 9:1.

4. The decorating composition of claim 1 wherein the weight ratio of the base metal portion of said flux compound to the combined palladium and silver is in the range of about 0.02:1 to 0.2:1.

5. The decorating composition of claim 1 wherein said base metal is selected from the class consisting of bismuth, chromium, lead, uranium, tin, iron, titanium, tantalum, zirconium and mixtures thereof.

6. The decorating composition of claim 1 wherein said palladium metallo-organic compound is a palladium salt of carboxylic acid, said silver metallo-organic compound is a silver salt of carboxylic acid and said metal flux metallo-organic compound is a metal salt of carboxylic acid in which said metal of said metal salt is selected from the group consisting of bismuth, chromium, lead, uranium, tin, iron, titanium, tantalum, zirconium and mixtures thereof.

7. The decorating composition of claim 1 wherein said palladium metallo-organic compound, said silver metallo-organic compound and said base metal metallo-organic flux compound are selected from the class consisting of metal sulfonates, metal sulfurized resinates, metal mercaptides, metal thioethers, and metal carboxylates.

8. The decorating composition of claim 1 wherein said palladium metallo-organic compound is palladium neodecanoate and said silver metallo organic compound is silver neodecanoate.

9. The decorating composition of claim 8 wherein said base metal metallo organic flux compound is bismuth neodecanoate.

10. A decorating composition for producing a gold appearance after being fired on ceramics comprises a vehicle containing an organic solvent in which metallo-organic compounds are dissolved, and is characterized in that the metal content of said composition, in addition to any trace impurities present, consists essentially of
    (a) a palladium carboxylate compound soluble in said solvent;
    (b) a silver carboxylate compound soluble in said solvent; and
    (c) a base metal carboxylate flux compound soluble in said solvent, said base metal being selected from the class consisting of bismuth, chromium, lead, uranium, tin, iron, titanium, tantalum, zirconium and mixtures thereof;
the weight ratio as metal of said palladium to said silver being in the range of 1:1 to 12:1, said palladium and silver together comprising at least about one percent by weight of said composition and said base metal flux being present in an amount to provide a weight ratio of said base metal to the combined palladium and silver in the range of about 0.02:1 to 0.2:1.

11. The decorating composition of claim 10 wherein said palladium and silver together comprise from about 1 to 12 weight percent of said composition.

12. The decorating composition of claim 10 wherein the weight ratio of palladium to silver is in the range of 2.3:1 to 9:1.

13. The decorating composition of claim 11 wherein said base metal is bismuth.

14. The decorating composition of claim 13 wherein each of said carboxylate compounds is a neodecanoate compound.

15. A method of producing a decoration having a gold appearance on ceramics after firing, comprising the steps of:
    (a) preparing a decorating composition comprising a vehicle containing an organic solvent in which metallo-organic compounds are dissolved, and characterized in that the metal content of said composition, in addition to any trace impurities present, consists essentially of:
       (1) a palladium metallo-organic compound soluble in said solvent;
       (2) a silver metallo-organic compound soluble in said solvent, the weight ratio as metal of said palladium to said silver being in the range of 1:1 to 12:1, said palladium and silver together comprising at least about one percent by weight of said composition; and
       (3) a base metal metallo-organic flux compound soluble in said solvent and present in an amount sufficient to flux said silver and said palladium;
    (b) applying said composition of (a) to the surface of a ceramic material to be decorated;
    (c) firing the ceramic material to be decorated after the applying of step (b) to produce a film having the appearance of gold on the ceramic surface.

16. The method of claim 15 wherein said firing is carried out at a temperature of between about 500° C. and 800° C.

17. The method of claim 15 wherein said metallo-organic compounds are metallo carboxylate compounds, said palladium and silver together comprise from about 1 to 12 percent by weight of said composition and said base metal is present in an amount sufficient to provide a weight ratio of base metal to the combined palladium and silver in the range of about 0.02:1 to 0.2:1.

* * * * *